(12) United States Patent
Inazumi

(10) Patent No.: US 10,784,050 B2
(45) Date of Patent: Sep. 22, 2020

(54) CAPACITOR

(71) Applicant: Panasonic Intellectual Property Management Co., Ltd., Osaka (JP)

(72) Inventor: Takuya Inazumi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 16/190,953

(22) Filed: Nov. 14, 2018

(65) Prior Publication Data

US 2019/0080850 A1   Mar. 14, 2019

Related U.S. Application Data

(63) Continuation of application No. PCT/JP2017/018612, filed on May 18, 2017.

(30) Foreign Application Priority Data

May 25, 2016 (JP) ................................. 2016-104387

(51) Int. Cl.
*H01G 4/38* (2006.01)
*H01G 4/224* (2006.01)
(Continued)

(52) U.S. Cl.
CPC ................ *H01G 4/38* (2013.01); *H01G 2/04* (2013.01); *H01G 2/106* (2013.01); *H01G 2/14* (2013.01);
(Continued)

(58) Field of Classification Search
None
See application file for complete search history.

(56) References Cited

U.S. PATENT DOCUMENTS 8,149,567 B2 * 4/2012 Niigaki ............... H01G 2/04
361/274.2
2007/0253146 A1 * 11/2007 Inoue ................. H01G 2/04
361/328
(Continued)

FOREIGN PATENT DOCUMENTS

CN    201421862 Y    3/2010
CN    104064351 A    9/2014
(Continued)

OTHER PUBLICATIONS

International Search Report of PCT application No. PCT/JP2017/018612 dated Aug. 1, 2017.
(Continued)

*Primary Examiner* — Dion Ferguson
(74) *Attorney, Agent, or Firm* — McDermott Will & Emery LLP

(57) ABSTRACT

A capacitor includes a capacitor element group, a first bus bar, a second bus bar, a case, a filling resin, and a temperature detection element. The capacitor element group includes a plurality of capacitor elements. The first and second bus bars are connected to electrodes of the plurality of capacitor elements. The case accommodates a capacitor unit in which the capacitor element group is connected to the first and second bus bars. The case is filled with the filling resin, and the filling resin is cured in the case. The first bus bar includes a contact region that is in contact with at least one capacitor element in the plurality of capacitor elements at a side close to an aperture of the case, the at least one capacitor element being positioned at a center of the capacitor element group. The temperature detection element is disposed on the contact region.

8 Claims, 12 Drawing Sheets

(51) Int. Cl.
*H01G 2/14* (2006.01)
*H01G 2/04* (2006.01)
*H01G 2/10* (2006.01)
*H01G 4/228* (2006.01)
*H01G 4/33* (2006.01)
*H01G 4/40* (2006.01)
*H01G 4/18* (2006.01)
*H01G 4/32* (2006.01)
*H01G 4/008* (2006.01)

(52) U.S. Cl.
CPC ............ *H01G 4/224* (2013.01); *H01G 4/228* (2013.01); *H01G 4/33* (2013.01); *H01G 4/40* (2013.01); *H01G 4/008* (2013.01); *H01G 4/18* (2013.01); *H01G 4/32* (2013.01)

(56) References Cited

U.S. PATENT DOCUMENTS

| | | | |
|---|---|---|---|
| 2011/0007480 A1* | 1/2011 | Souda | B60K 6/28 361/728 |
| 2014/0285969 A1 | 9/2014 | Kojima et al. | |
| 2014/0294045 A1 | 10/2014 | Hironaka | |

FOREIGN PATENT DOCUMENTS

| | | |
|---|---|---|
| CN | 104103417 A | 10/2014 |
| JP | 2009-111370 | 5/2009 |
| JP | 2014-203893 | 10/2014 |
| JP | 2014-207427 | 10/2014 |

OTHER PUBLICATIONS

English Translation of Chinese Search Report dated Dec. 25, 2019 for the related Chinese Patent Application No. 201780030484.6.

* cited by examiner

CAPACITOR

RELATED APPLICATIONS

This application is a continuation of the PCT International Application No. PCT/JP2017/018612 filed on May 18, 2017, which claims the benefit of foreign priority of Japanese patent application No. 2016-104387 filed on May 25, 2016, the contents all of which are incorporated herein by reference.

BACKGROUND

1. Technical Field

The present disclosure relates to capacitors.

2. Description of the Related Art

Conventionally, capacitor modules include: a plurality of capacitor elements arrayed inside a case; and a bus bar connected to electrodes in each of the plurality of capacitor elements. Such capacitor modules may become high temperature by the heat generated when large electric current flows. Thus, some capacitor modules employ a configuration in which a temperature of the capacitor elements is detected by using a thermistor. One example of such capacitor modules is disclosed in Unexamined Japanese Patent Publication No. 2014-203893.

In the capacitor module disclosed in Unexamined Japanese Patent Publication No. 2014-203893, a bus bar includes a contact part and an extending part. The contact part is in contact with a heated portion of capacitor elements, and the extending part is separated from a current route of the bus bar and extends in a direction away from the contact part. A thermistor is provided in the extending part.

SUMMARY

A capacitor according to a first aspect of the present disclosure includes a capacitor element group, a first bus bar, a second bus bar, a case, a filling resin, and a temperature detection element. The capacitor element group includes a plurality of capacitor elements in which three or more of capacitor elements are arrayed in a first direction and one or more of capacitor elements are arrayed in a second direction. The second direction being perpendicular to the first direction. The first bus bar is connected to first electrodes of the plurality of capacitor elements, whereas the second bus bar is connected to second electrodes of the plurality of capacitor elements. The case accommodates a capacitor unit in which the capacitor element group is connected to the first bus bar and the second bus bar. The case is filled with the filling resin, and the filling resin is cured in the case. The first bus bar includes a contact region that is in contact with at least one capacitor element in the plurality of capacitor elements at a side close to an aperture of the case. The at least one capacitor element is positioned at a center of the capacitor element group in the first direction and in the second direction. The temperature detection element is disposed on the contact region.

The present disclosure provides a capacitor that enables accurate detection of an overheated state of capacitor elements.

Effects or meanings of the present disclosure will be further clarified in the following description of an exemplary embodiment. However, the following exemplary embodiment is illustrative only for implementation of the present disclosure, and the present disclosure is not at all restrictive of the following exemplary embodiment.

DETAILED DESCRIPTION OF EMBODIMENT

Figure 1:
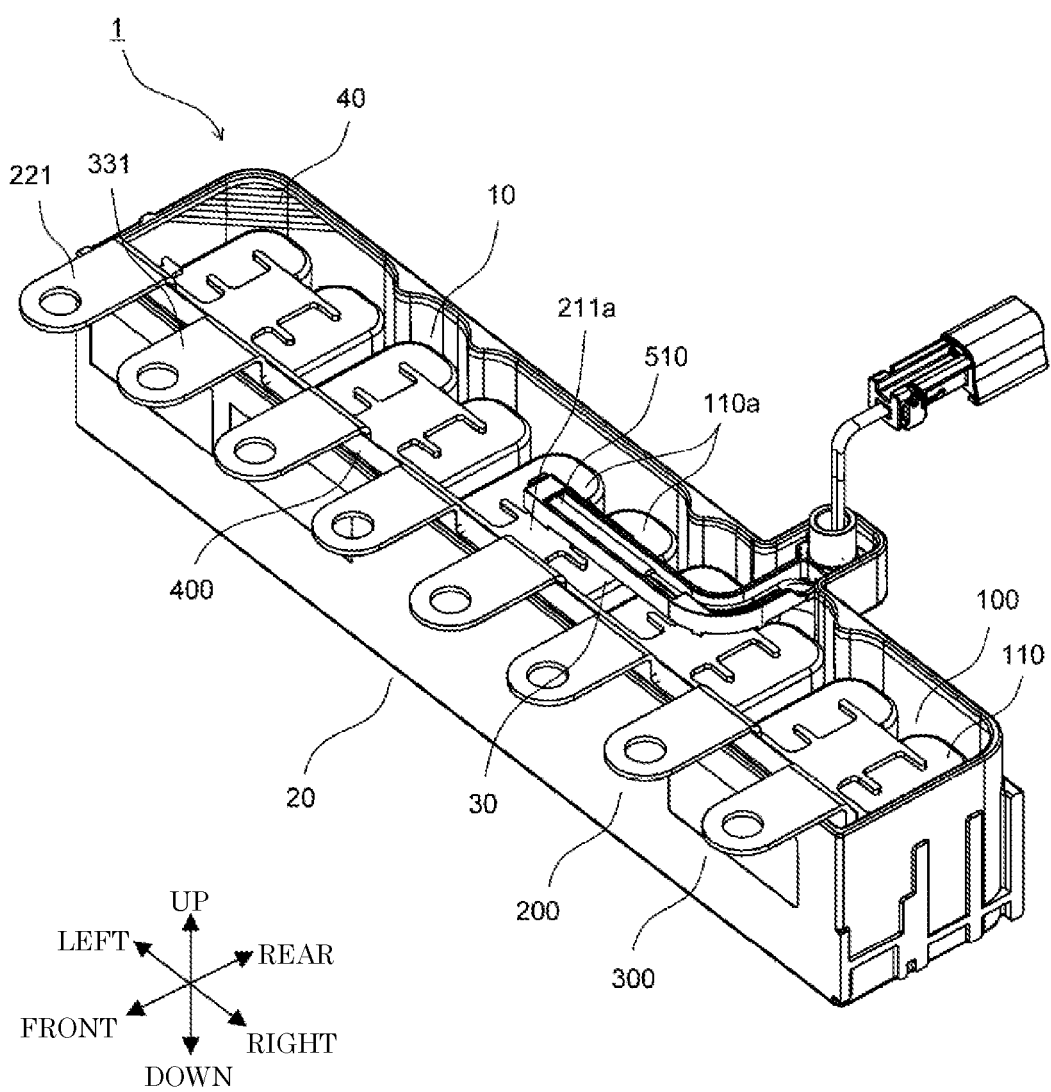
FIG. 1 is a front perspective view illustrating a film capacitor according to an exemplary embodiment.

Prior to describing an exemplary embodiment of the present disclosure, problems with conventional film capacitors will be described briefly.

When a plurality of capacitor elements are disposed inside a case, a capacitor element positioned at the center becomes the hottest, because the central capacitor element cannot radiate heat as efficiently as the other capacitor elements.

In the capacitor module disclosed in Unexamined Japanese Patent Publication No. 2014-203893, an extending part provided with a thermistor is considerably apart from a central capacitor element. Therefore, the thermistor does not easily become hot compared with the central capacitor element. Consequently, this capacitor module makes it difficult to accurately detect an overheated state of the capacitor elements. Thus, there is a concern that a temperature of the capacitor elements which exceeds a control limit causes the capacitor module to thermally run away.

In view of the above problems, the present disclosure provides a capacitor that enables accurate detection of an overheated state of capacitor elements.

With reference to the accompanying drawings, film capacitor 1, which is an exemplary embodiment of a capacitor of the present disclosure, will be described below. For the sake of convenience, directions including front and rear, right and left, and up and down are added to the drawings as appropriate. These directions are not absolute directions but relative directions in relation to an orientation of film capacitor 1.

In this exemplary embodiment, film capacitor 1 is an example of a "capacitor" described in the claims. Upper end electrodes 111 are an example of "first electrodes" described in the claims, and lower end electrodes 112 are an example of "second electrodes" described in the claims. Upper bus bar 200 is an example of a "first bus bar" described in the claims, and lower bus bar 300 is an example of a "second bus bar" described in the claims. Central electrode terminal 211a is an example of a "contact region" described in the claims. First pressing part 611 is an example of a "first pressing part" described in the claims, second pressing part 612 is an example of a "second pressing part" described in the claims, and third pressing part 614 is an example of a "third pressing part" described in the claims. Upper aperture 613 and lower aperture 616 are examples of a "flow opening" described in the claims.

However, the above description merely defines correspondences between constituents of the present disclosure and constituents described in the exemplary embodiment. These correspondences are not intended to narrow the scope of the claims by using the configuration described in the exemplary embodiment.

FIG. 1 is a front perspective view illustrating film capacitor 1 according to the exemplary embodiment. In FIG. 1, a part of filling resin 40 is hatched, and the remaining part is transparent, for the sake of convenience.

Film capacitor 1 includes: capacitor unit 10; case 20 that contains capacitor unit 10; temperature detection unit 30 that detects a temperature of capacitor unit 10; and filling resin 40 filled in case 20.

Figure 2A:
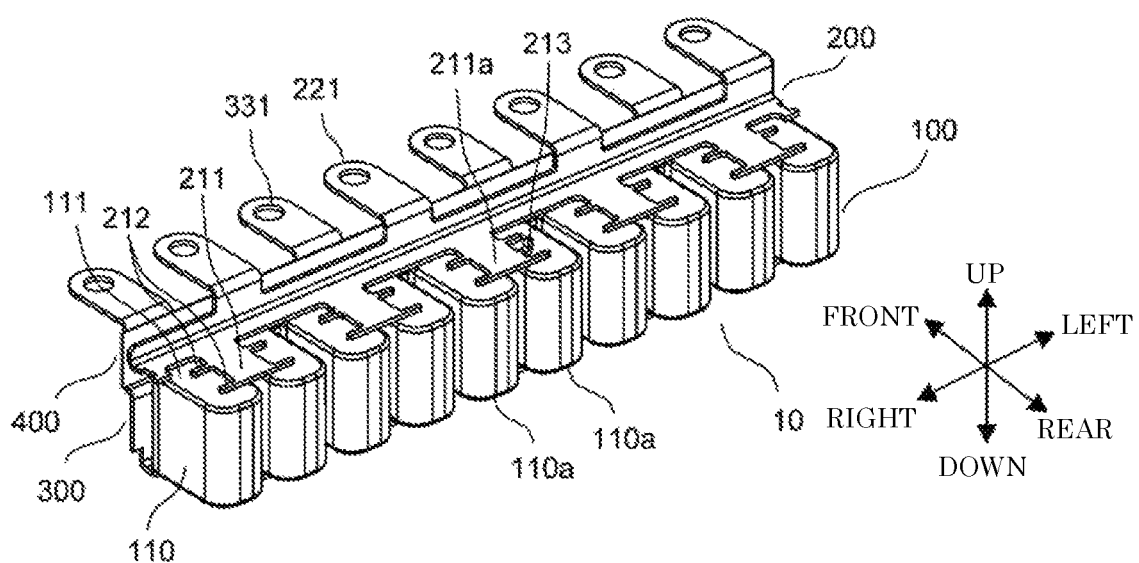
FIG. 2A is a rear perspective view illustrating a capacitor unit according to the exemplary embodiment.
Figure 2B:
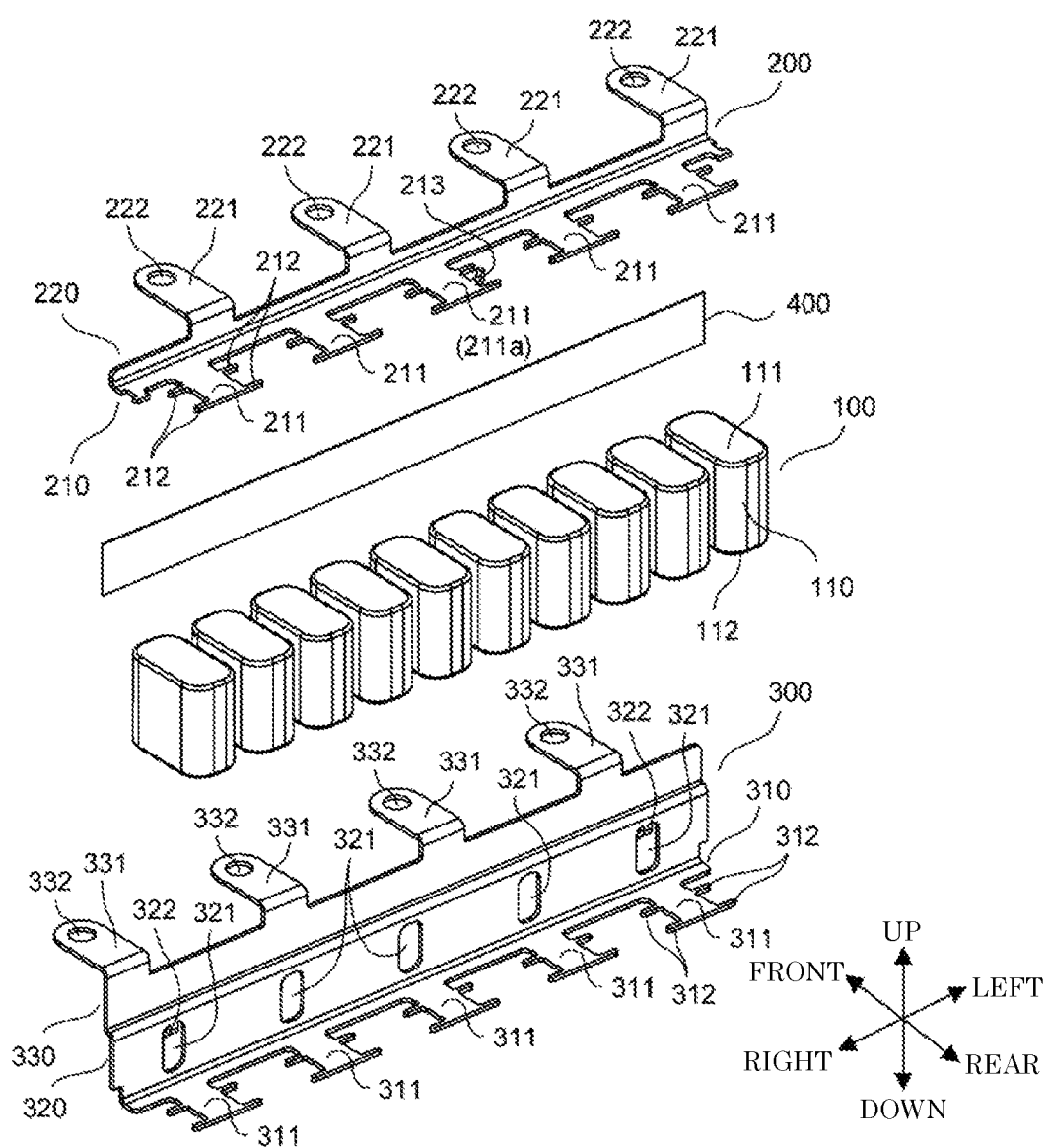
FIG. 2B is an exploded perspective view illustrating the capacitor unit according to the exemplary embodiment.

FIG. 2A is a rear perspective view of capacitor unit 10 according to the exemplary embodiment, and FIG. 2B is an exploded perspective view of capacitor unit 10 according to the exemplary embodiment.

Capacitor unit 10 includes capacitor element group 100, upper bus bar 200, lower bus bar 300, and insulating sheet 400.

Capacitor element group 100 includes a plurality of capacitor elements 110. In the exemplary embodiment, capacitor element group 100 includes 10 capacitor elements 110. Further, 10 capacitor elements 110 are arrayed along a shorter side of capacitor elements 110 (in a right-to-left direction of FIGS. 2A and 2B) with their first and second end surfaces facing upward and downward, respectively. In the exemplary embodiment, capacitor elements 110 are arrayed in a single line. In other words, a plurality of capacitor elements 110 are not arrayed along their longer side.

Each of capacitor elements 110 is formed by vapor-depositing aluminum on dielectric films to form two metalized films, by overlaying the metalized films on each other, by winding or laminating the metalized films, and by pressing the metalized films into a flat shape. Upper end electrodes 111 are formed on the upper end surfaces of capacitor elements 110 by spraying a metal such as zinc. Similarly, lower end electrodes 112 are formed on the lower end surfaces of capacitor elements 110 by spraying the metal such as zinc. In the exemplary embodiment, each of capacitor elements 110 is formed of metalized films in which aluminum is deposited on dielectric films. As an alternative example, capacitor element 110 may be formed of metalized films in which another metal such as zinc or magnesium is deposited on dielectric films. As another alternative example, capacitor element 110 may be formed of metalized films in which some of the above-described metals are deposited on dielectric films. As still another alternative example, capacitor element 110 may be formed of metalized films in which an alloy of the above-described metals is deposited on dielectric films.

Upper bus bar 200, which is made of a conductive material such as a copper plate, includes first electrode terminal part 210 and first connecting terminal part 220. For example, upper bus bar 200 may be formed by appropriately cutting off a single piece from a copper plate and by bending this piece. Thus, first electrode terminal part 210 and first connecting terminal part 220 are in an integrated form.

First electrode terminal part 210 includes five first electrode terminals 211 extending from its base portion toward the rear. Each of first electrode terminals 211 corresponds to two capacitor elements 110. Each first electrode terminal 211 makes contact with upper end electrodes 111 of two corresponding capacitor elements 110 by bridging these capacitor elements 110. Two connection pins 212 are formed on each side of each first electrode terminal 211, and are electrically connected to upper end electrode 111 of corresponding one of capacitor elements 110 with a connection method such as soldering.

In capacitor element group 100, fifth and sixth capacitor elements 110 from one end of capacitor element group 100 are capacitor elements positioned at the center (hereinafter referred to as "central capacitor elements 110a"). In five first electrode terminals 211, the central first electrode terminal (hereinafter referred to as "central electrode terminal 211a") that is in contact with central capacitor elements 110a corresponds to a contact region of upper bus bar 200. When electric current flows through capacitor element group 100, capacitor elements 110 generate heat. At this time, central capacitor elements 110a cannot radiate the heat as efficiently as the other capacitor elements 110a, thus becoming the hottest. Since the heat of central capacitor elements 110a is immediately transferred to central electrode terminal 211a, central electrode terminal 211a becomes substantially as hot as central capacitor elements 110a.

Central electrode terminal 211a includes engagement projection 213 that is used to anchor temperature detection unit 30. Engagement projection 213 is disposed between two left connection pins 212, and protrudes upward.

First connecting terminal part 220 includes four first connecting terminals 221 on its upper side. First connecting terminals 221 are formed at substantially equal intervals in the right-to-left direction. Each of first connecting terminals 221 extends upward, and is bent at a substantially right angle to extend forward in the front direction. Ends of first connecting terminals 221 overhang forward from case 20 in the front direction (see FIG. 1). Each of the ends of first connecting terminals 221 has mounting hole 222. Terminals (not illustrated) of an external device are fixed to first connecting terminals 221 by screwing through mounting holes 222.

Lower bus bar 300, which is made of a conductive material such as a copper plate, includes second electrode terminal part 310, coupling part 320, and second connecting terminal part 330. For example, lower bus bar 300 may be formed by appropriately cutting off a single piece from a copper plate and by bending this piece. Thus, second electrode terminal part 310, coupling part 320, and second connecting terminal part 330 are in an integrated form.

Second electrode terminal part 310 includes five second electrode terminals 311 extending from its base portion toward the rear. Each of second electrode terminals 311 corresponds to two capacitor elements 110. Each second electrode terminal 311 makes contact with lower end electrodes 112 of two corresponding capacitor elements 110 by bridging these capacitor elements 110. Two connection pins 312 are formed on each side of second electrode terminals 311, and are electrically connected to lower end electrode 112 of one of corresponding capacitor elements 110 with a connection method such as soldering.

Coupling part 320 joins second electrode terminal part 310 to second connecting terminal part 330. Coupling part 320 extends to upper ends of capacitor elements 110 so as to cover front surfaces of capacitor elements 110. Coupling part 320 has five flow holes 321 each of which has an oval shape. Hooks 322 that protrude forward are provided at upper edges of flow holes 321 positioned at both ends of coupling part 320 (see FIG. 8).

Second connecting terminal part 330 is formed so as to slightly overhang forward from coupling part 320 in the front direction, in order to avoid interference from first connecting terminal part 220. Second connecting terminal part 330 includes four second connecting terminals 331 on its upper side. Second connecting terminals 331 are formed at substantially equal intervals in the right-to-left direction. Each of second connecting terminals 331 extends upward, and is bent at a substantially right angle to extend forward in the front direction. Ends of second connecting terminals 331 overhang forward from case 20 in the front direction (see FIG. 1). First connecting terminals 221 and second connecting terminals 331 are arrayed in an alternating manner in the right-to-left direction. Each of the ends of second connecting terminals 331 has mounting hole 332. Terminals (not illustrated) of an external device are fixed to second connecting terminals 331 by screwing through mounting holes 332.

Insulating sheet 400 is made of an insulating resin material, such as insulating paper, acrylic, or silicone. Insulating sheet 400, which has a rectangular shape, is somewhat larger in size than upper bus bar 200 and lower bus bar 300 in the right-to-left direction. Insulating sheet 400 electrically insulates upper bus bar 200 from lower bus bar 300.

Figure 3A:
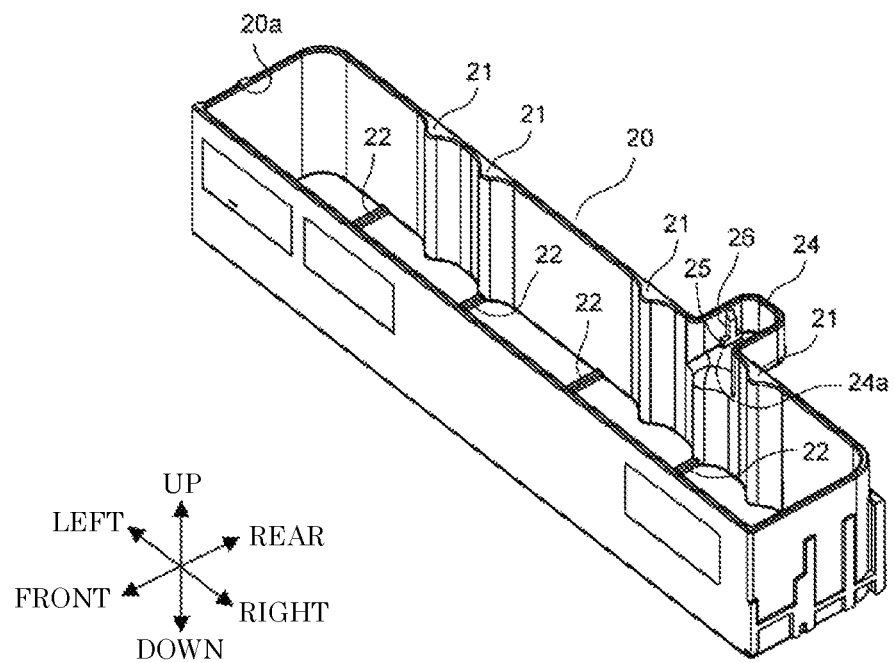
FIG. 3A is a front perspective view illustrating a case according to the exemplary embodiment.
Figure 3B:
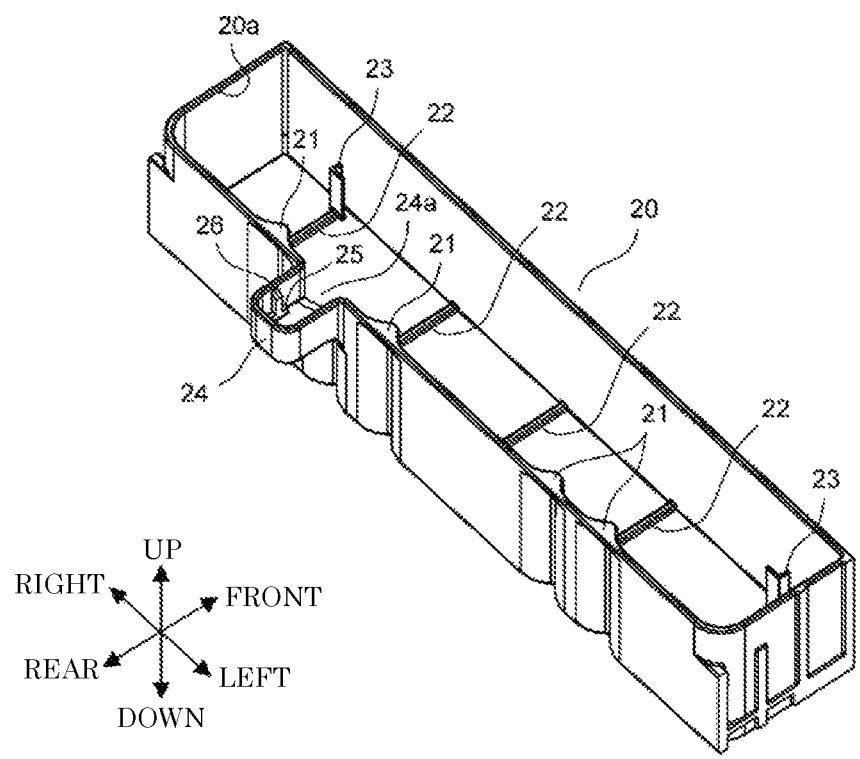
FIG. 3B is a rear perspective view illustrating the case according to the exemplary embodiment.

FIG. 3A is a front perspective view illustrating case 20 according to the exemplary embodiment; FIG. 3B is a rear perspective view illustrating case 20 according to the exemplary embodiment.

Case 20 is made of a resin material such as polyphenylene sulfide (PPS). Case 20 has a substantially rectangular, cubic shape, and has aperture 20a at its upper surface. Four overhanging parts 21 are formed on an inner rear surface of case 20, each of which has a ridge shape protruding inward. Overhanging parts 21 are arrayed in the right-to-left direction. Further, overhanging parts 21 overhang into a space between capacitor element group 100 contained in case 20 and the inner rear surface of case 20. This configuration successfully decreases the space, thereby contributing to reduce quantity of filling resin 40 to be filled in case 20.

Five support ribs 22 extending in a front-to-rear direction are formed on an inner bottom of case 20 at different locations, respectively. It should be noted that only four support ribs 22 are illustrated in both FIGS. 3A and 3B, and rightmost support rib 22 is hidden in FIG. 3A and leftmost support rib 22 is hidden in FIG. 3B. Receiving parts 23 for receiving hooks 322 of lower bus bar 300 are formed on the inner bottom of case 20, which are positioned at front ends of rightmost and leftmost support ribs 22.

Engagement part 24 is formed on a rear surface of case 20 at its upper location and between the center and the right end of case 20. Engagement part 24, which has a substantially cubic shape, has an aperture in its upper and front surfaces. And engagement part 24 communicates with an interior of case 20 via aperture 24a formed in the front surface. Engagement part 24 includes two mount ribs 25 and engagement ribs 26 inside. Mount ribs 25 are formed on the bottom of engagement part 24 in contact with the right and left surfaces so as to extend in the front-to-rear direction, and engagement ribs 26 extend in the up-to-down direction from centers of mount ribs 25 along the right and left surfaces.

Figure 4:
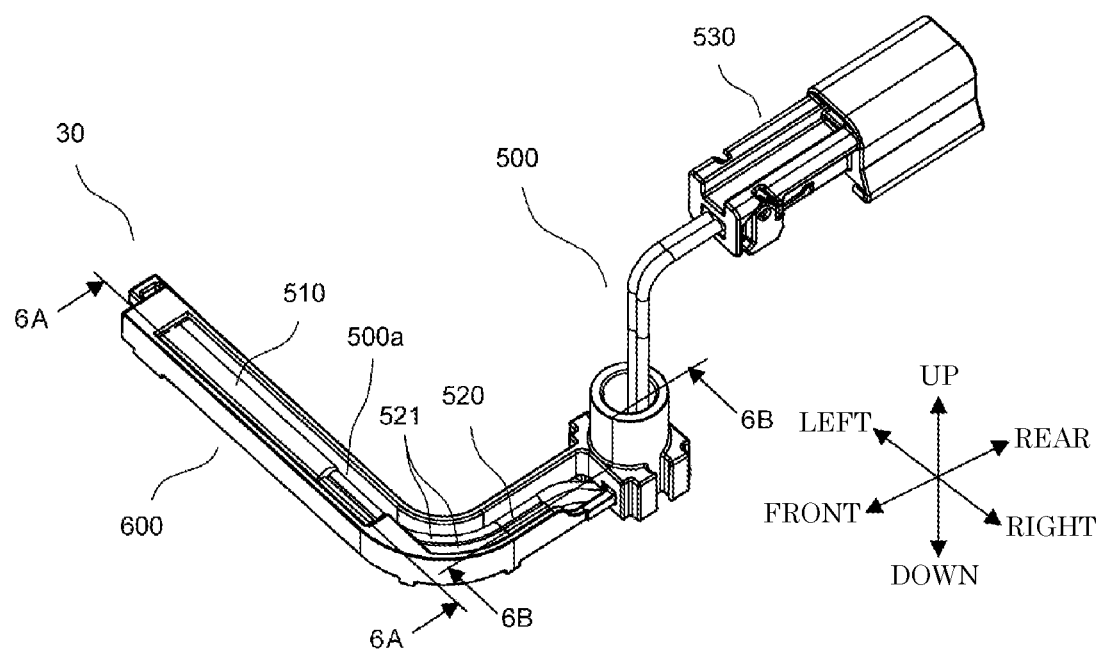
FIG. 4 is a front perspective view illustrating a temperature detection unit according to the exemplary embodiment.
Figure 5A:
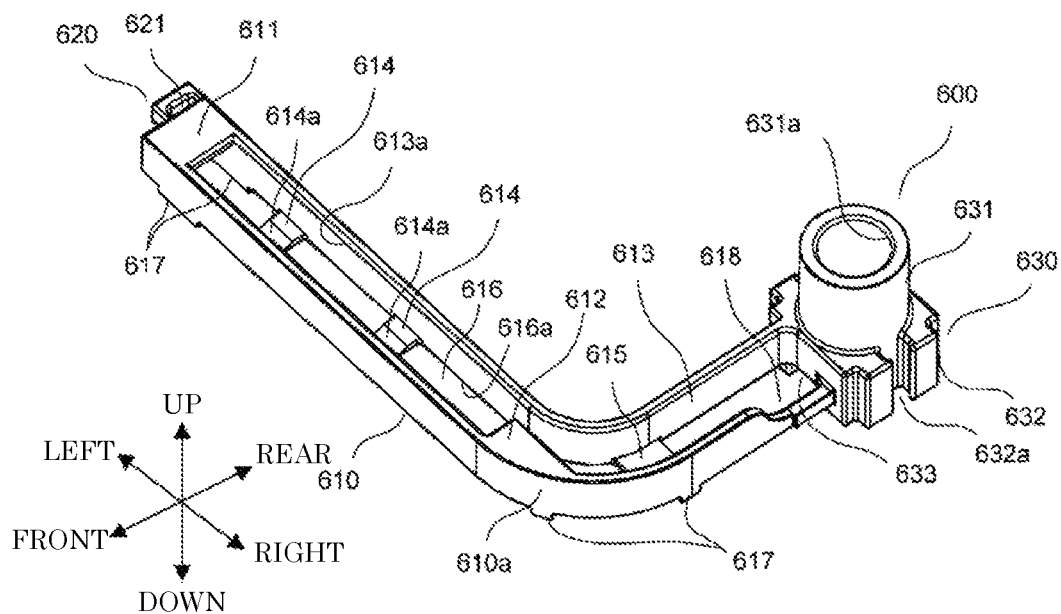
FIG. 5A is a front perspective view illustrating a holder according to the exemplary embodiment.
Figure 5B:
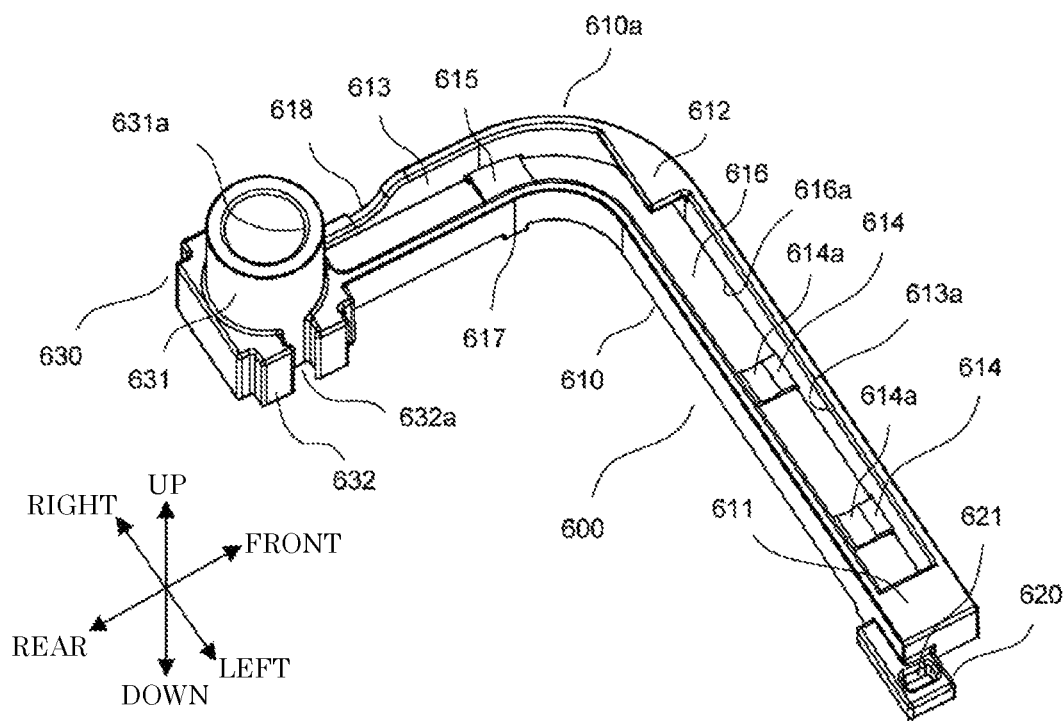
FIG. 5B is a rear perspective view illustrating the holder according to the exemplary embodiment.
Figure 6A:
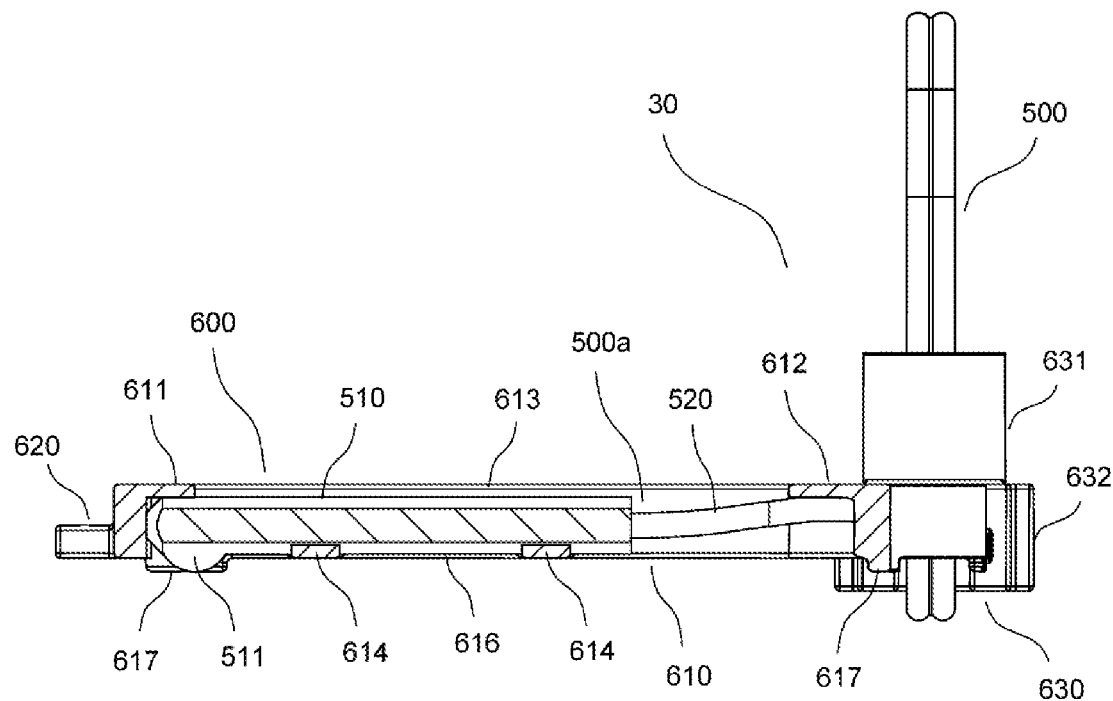
FIG. 6A is a cross sectional view taken along the line 6A-6A in FIG. 4, according to the exemplary embodiment.
Figure 6B:
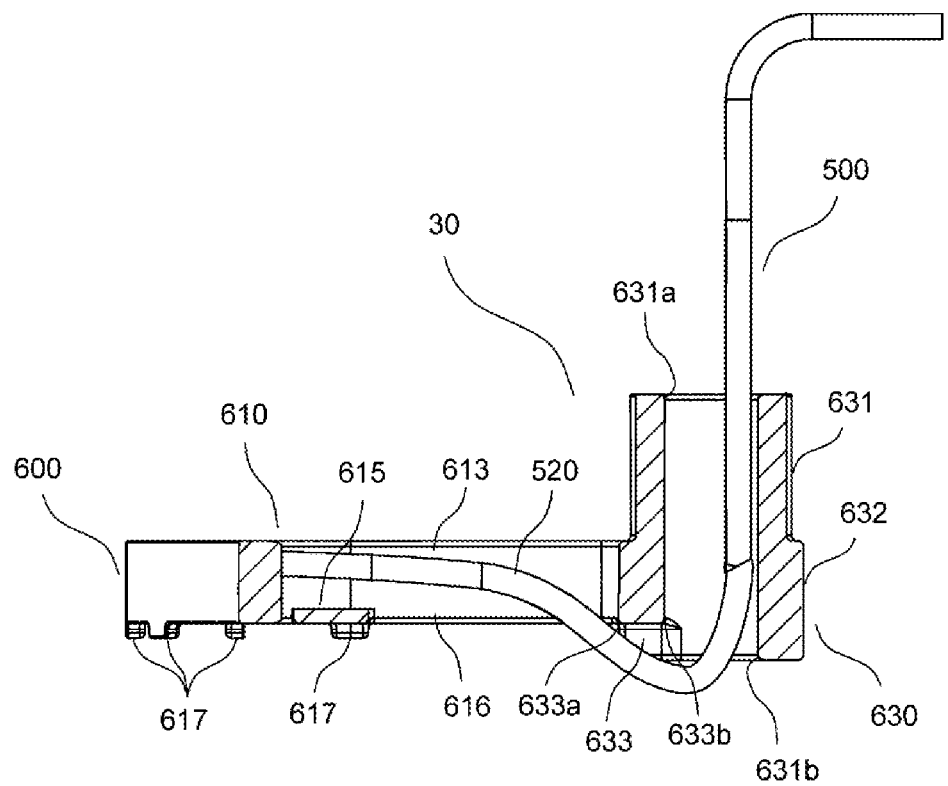
FIG. 6B is a cross sectional view taken along the line 6B-6B in FIG. 4, according to the exemplary embodiment.

FIG. 4 is a front perspective view illustrating temperature detection unit 30 according to the exemplary embodiment. FIG. 5A is a front perspective view illustrating holder 600 according to the exemplary embodiment; FIG. 5B is a rear perspective view illustrating holder 600. FIG. 6A is a cross sectional view taken along the line 6A-6A in FIG. 4, according to the exemplary embodiment; FIG. 6B is a cross sectional view taken along the line 6B-6B in FIG. 4. It should be noted that connector 530 is not illustrated in both FIGS. 6A and 6B.

Temperature detection unit 30 includes: sensor unit 500; and holder 600 that retains sensor unit 500. Sensor unit 500 includes: temperature detection element 510 such as a thermistor; harness 520 that has two wires (output signal lines) 521 extending from temperature detection element 510; and connector 530 provided at an end of harness 520. Temperature detection element 510 has a head end provided with thermosensing part 511 protruding downward. Thermosensing part 511 senses temperature.

Holder 600, made of a resin material such as PPS, possess heat resistance and insulating properties. Holder 600 includes housing 610, bus-bar-side fixing part 620, and case-side fixing part 630.

Housing 610 has curved part 610a at its midway. Curved part 610a is smoothly curved toward the rear at a substantially right angle, in other words, is formed into a substantially L shape as viewed from the top. Housing 610 accommodates temperature detection element 510 and harness 520. When holder 600 is mounted on case 20, temperature detection element 510 and harness 520 are positioned above capacitor unit 10 along aperture 20a of case 20.

An upper surface of housing 610 is open in its overall part except first pressing part 611 provided at the head end and second pressing part 612 provided in curved part 610a. Inner periphery 613a around upper aperture 613 is chamfered so as to become round, so that harness 520 is not damaged. Likewise, the bottom of housing 610 is open in its overall part except two third pressing parts 614 and fourth pressing part 615. Two third pressing parts 614 are disposed between first pressing part 611 and second pressing part 612. Fourth pressing part 615 is disposed in curved part 610a. Inner periphery 616a around lower aperture 616 is also chamfered so as to become round. Each of third pressing part 614 includes dent 614a into which the bottom of temperature detection element 510 fits.

Housing 610 includes two feet 617 on an outer lower surface of the head end and three feet 617 on an outer lower surface of curved part 610a. In addition, housing 610 has notch 618 on one side surface of its base end. Notch 618 is formed by cutting off the side surface from its upper portion.

Bus-bar-side fixing part 620 is integrally formed at the head end of housing 610. Bus-bar-side fixing part 620 has engagement hole 621 penetrating bus-bar-side fixing part 620 in an up-to-down direction. Engagement hole 621 conforms to the shape of engagement projection 213 of upper bus bar 200.

Case-side fixing part 630 is integrally formed at a base end of housing 610. Case-side fixing part 630 includes guide 631, engagement part 632, and passage 633. Guide 631 has a cylindrical shape and has an aperture formed in the up-to-down direction. Engagement part 632 has a square outer shape and is disposed around a lower portion of guide 631. And, through passage 633, an interior of guide 631 communicates with the base end of housing 610. Inner periphery 631a around upper aperture of guide 631 and inner periphery 631b around lower aperture of guide 631 are respectively chamfered so as to become round, so that harness 520 is not damaged. Each of inner periphery of passage 633 at a side close to housing 610 and inner periphery of passage 633 at a side close to guide 631 is also chamfered so as to become round. Engagement part 632 has engagement grooves 632a formed, in the up-to-down direction, on each of its right and left sides.

Temperature detection element 510 is disposed at the head end of housing 610. Harness 520 extends from the base end of housing 610 to guide 631 of case-side fixing part 630 via passage 633 of case-side fixing part 630 and further extends upward from guide 631 to the outside. In housing 610, first pressing part 611 and second pressing part 612 press down set 500a of temperature detection element 510 and harness 520, and third pressing parts 614 press up set 500a. That is, set 500a is supported at three points, or two upper points and one lower point, close to the head end of housing 610. This configuration suppresses harness 520 from moving in a direction from the head end to the base end, in other words, in a direction to be removed from housing 610.

Filling resin 40 is a thermosetting resin. As one example, filling resin 40 may be an epoxy resin. Alternatively, filling resin 40 may be a urethane resin. As illustrated in FIG. 1, filling resin 40 covers main portions of capacitor unit 10 and temperature detection unit 30, thereby protecting these main portions from external moisture and shock.

Figure 7A:
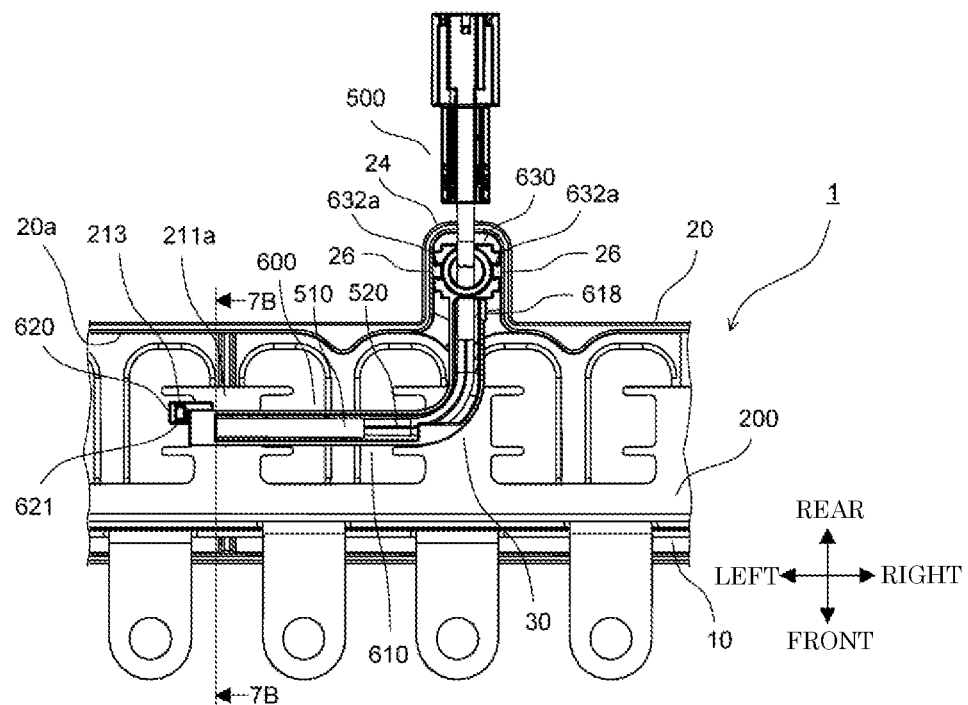
FIG. 7A is a plan view illustrating main portions of the film capacitor, according to the exemplary embodiment, in a state where the capacitor unit and the temperature detection unit are placed inside the case.
Figure 7B:
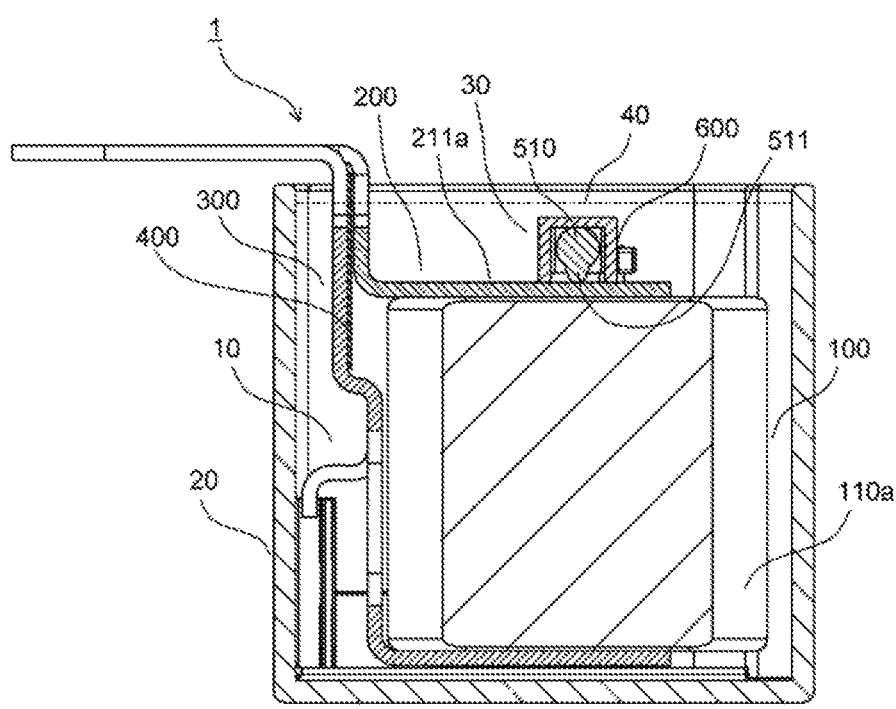
FIG. 7B is a cross sectional view taken along the line 7B-7B in FIG. 7A, according to the exemplary embodiment.
Figure 8:
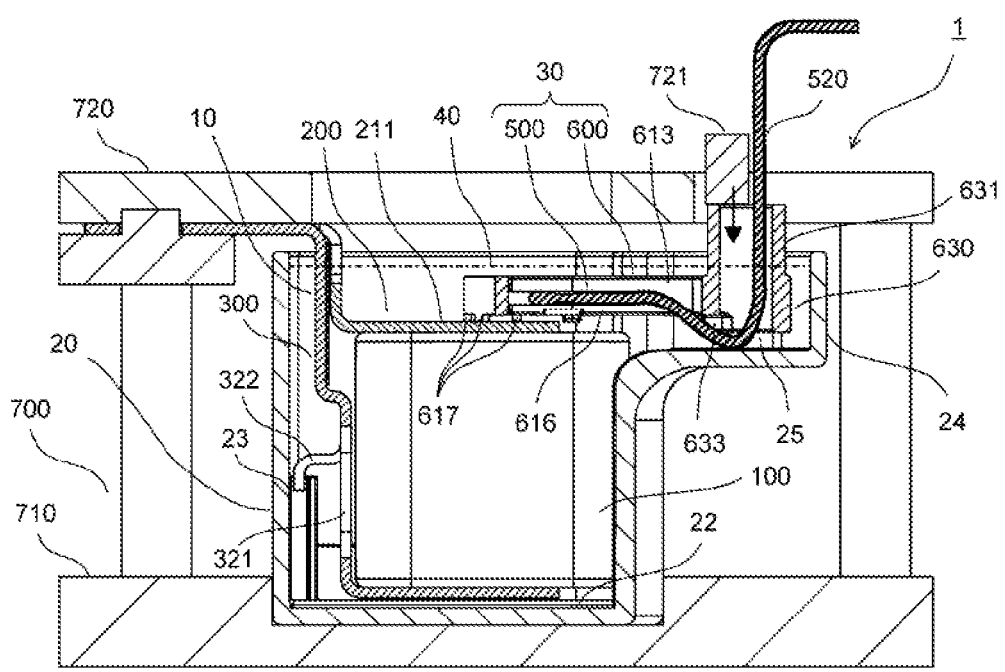
FIG. 8 is a side cross sectional view illustrating the film capacitor and a fixture, according to the exemplary embodiment, in a state where the film capacitor is installed in the fixture in order to pour a filling resin into the film capacitor.

FIG. 7A is a plan view illustrating main portions of film capacitor 1, according to the exemplary embodiment, in a state where capacitor unit 10 and temperature detection unit 30 are installed inside case 20. FIG. 7B is a cross sectional view taken along the line 7B-7B in FIG. 7A, according to the exemplary embodiment. FIG. 8 is a side cross sectional view illustrating fixture 700 and film capacitor 1, according to the exemplary embodiment, in a state where film capacitor 1 is installed in fixture 700 in order to pour filling resin 40 into film capacitor 1. It should be noted that connector 530 is not illustrated in FIG. 8.

When film capacitor 1 is assembled, both upper bus bar 200 and lower bus bar 300 are joined to capacitor element group 100 to constitute capacitor unit 10. Then, capacitor unit 10 is placed inside case 20. Thereafter, temperature detection unit 30 is mounted on capacitor unit 10 at a predetermined location.

In temperature detection unit 30, as illustrated in FIG. 7A, case-side fixing part 630 of holder 600 is moved downward and fits into engagement part 24 of case 20. In this case, engagement ribs 26 of engagement part 24 fit into engagement grooves 632a of case-side fixing part 630. Furthermore, engagement projection 213 of central electrode terminal 211a of upper bus bar 200 fits into engagement hole 621 of bus-bar-side fixing part 620 of holder 600 in temperature detection unit 30. In this way, case-side fixing part 630 is fixed to case 20, and bus-bar-side fixing part 620 is fixed to upper bus bar 200. As a result, holder 600, namely, temperature detection unit 30 is fixed to both case 20 and upper bus bar 200 so that temperature detection unit 30 does not move in the right, left, forward, and backward directions, in other words, along the plane of aperture 20a in case 20. Temperature detection element 510 held by holder 600 has an end at which thermosensing part 511 is disposed, and at least this end is positioned on central electrode terminal 211a. As illustrated in FIG. 7B, thermosensing part 511 of temperature detection element 510 is in contact with central electrode terminal 211a.

As illustrated in FIG. 8, fixture 700 is used to pour filling resin 40 into case 20 in which capacitor unit 10 and temperature detection unit 30 are installed. Fixture 700 includes base 710, and cover 720 joined to base 710. Fixture 700 is used to anchor both capacitor unit 10 and case 20 while capacitor unit 10 is positioned inside case 20 at a predetermined location. Capacitor unit 10 is placed inside case 20 so that hooks 322 of lower bus bar 300 are caught by receiving parts 23 of case 20. As a result, capacitor unit 10 hardly moves from the fixed location.

Cover 720 in fixture 700 includes pressurizing part 721. Pressurizing part 721 presses down case-side fixing part 630 of holder 600 in such a way that temperature detection unit 30 does not move upward inside case 20. As a result, a vertical location of holder 600, namely, a vertical location of temperature detection unit 30 is kept so that thermosensing part 511 of temperature detection element 510 is kept in contact with central electrode terminal 211a.

Filling resin 40 in liquid form is poured into case 20 in which capacitor unit 10 and temperature detection unit 30 are installed. In this case, the pouring of filling resin 40 into case 20 is performed until filling resin 40 reaches a location (denoted by an alternate long and short dash line in FIG. 8) where housing 610 of holder 600 is completely embedded. In this case, filling resin 40 is poured into housing 610 through upper aperture 613 and lower aperture 616, so that the housing 610 is filled with filling resin 40. Also, filling resin 40 is poured into engagement part 24, so that engagement part 24 is filled with filling resin 40. In engagement part 24, case-side fixing part 630 is mounted on mount ribs 25 with a gap between case-side fixing part 630 and engagement part 24. Through this gap and passage 633, filling resin 40 is poured into guide 631. This configuration enables guide 631 to be easily filled with filling resin 40. Moreover, notch 618 is formed in the left side of the base end of housing 610 in holder 600. This configuration suppresses a gap from being created between engagement part 24 and the base end of housing 610, in other words, suppresses bubbles from being created between engagement part 24 and the base end of housing 610.

Five flow holes 321 are formed in lower bus bar 300. Through flow holes 321, filling resin 40 is easily poured in a space between lower bus bar 300 and capacitor element group 100. Furthermore, by providing five support ribs 22 on the inner bottom of case 20, a gap is created between capacitor element group 100 and the inner bottom of case 20. This configuration enables filling resin 40 to be poured in the space between capacitor element group 100 and the inner bottom of case 20. Moreover, by providing five feet 617 on the outer lower surface of holder 600, a gap is created between holder 600 and upper bus bar 200. This configuration enables filling resin 40 to be poured in the space between holder 600 and upper bus bar 200.

After case 20 is filled with filling resin 40, case 20 is heated. Filling resin 40 in liquid form is thereby cured.

Through the above processing, film capacitor 1 of a case molding type is completely assembled.

Inside case 20, entire holder 600 including case-side fixing part 630 is anchored by cured filling resin 40. Therefore, holder 600, namely, temperature detection unit 30 is not removed upward from case 20. Furthermore, temperature detection element 510 and harness 520 are anchored in housing 610 by filling resin 40 cured in housing 610 of holder 600. In this case, even if a tensile force is applied to connector 530, temperature detection element 510 and harness 520 cannot be removed easily from holder 600.

<Effects of Exemplary Embodiment>

Effects of the foregoing exemplary embodiment will be described below. Temperature detection element 510 is disposed on central electrode terminal 211a (in the contact region of upper bus bar 200) that is in contact with central capacitor elements 110a in capacitor element group 100. Temperature detection element 510 thereby can detect a temperature of the hottest portion of capacitor unit 10 or its adjacent portion when electric current flows. This configuration can accurately detect that capacitor elements 110 constituting capacitor element group 100 are in an overheated state, thereby preventing thermal runaway of film capacitor 1.

Temperature detection element 510 is retained in holder 600, and holder 600 is fixed to case 20. Temperature detection element 510 thereby can be installed firmly on central electrode terminal 211a inside case 20.

Case-side fixing part 630 of holder 600 fits into engagement part 24 of case 20, thereby anchoring holder 600 inside case 20 along aperture 20a of case 20 (in the forward, backward, right, and left directions). In addition, filling resin 40 that is poured and cured in engagement part 24 secures case-side fixing part 630 to engagement part 24, thereby anchoring holder 600 so as not to move in a direction (in the up-to-down direction) in which case-side fixed fixing 630 fits into engagement part 24. This configuration can firmly secure holder 600, namely, temperature detection unit 30 to case 20.

Engagement projection 213 of central electrode terminal 211a fits into engagement hole 621 of bus-bar-side fixing part 620 so that holder 600 is fixed to not only case 20 but also upper bus bar 200. This configuration can firmly anchor holder 600, namely, temperature detection unit 30 inside case 20.

Housing 610 of holder 600 has curved part 610a. Harness 520 extending inside housing 610 is in contact with the inner surface of curved part 610a, thereby acting as a resistance that hinders temperature detection element 510 and harness 520 from moving inside housing 610. In addition, first pressing part 611, second pressing part 612, and third pressing parts 614 support set 500a of temperature detection element 510 and harness 520 at three points, or two upper points and one lower point, near the head end of housing 610 of holder 600, thereby suppressing temperature detection element 510 and harness 520 from moving inside housing 610. This configuration can reduce the risk of temperature detection element 510 being displaced from the predeterminded location in housing 610.

Housing 610 of holder 600 has upper aperture 613 and lower aperture 616, via which filling resin 40 is poured into housing 610. This configuration can anchor temperature detection element 510 and harness 520 inside housing 610 with cured filling resin 40.

VARIATIONS

Although the exemplary embodiment of the present disclosure has been described above, the present disclosure is not limited to the exemplary embodiment described above, and moreover, variations can be applied to application examples according to the present disclosure besides the exemplary embodiment described above.

Figure 9A:
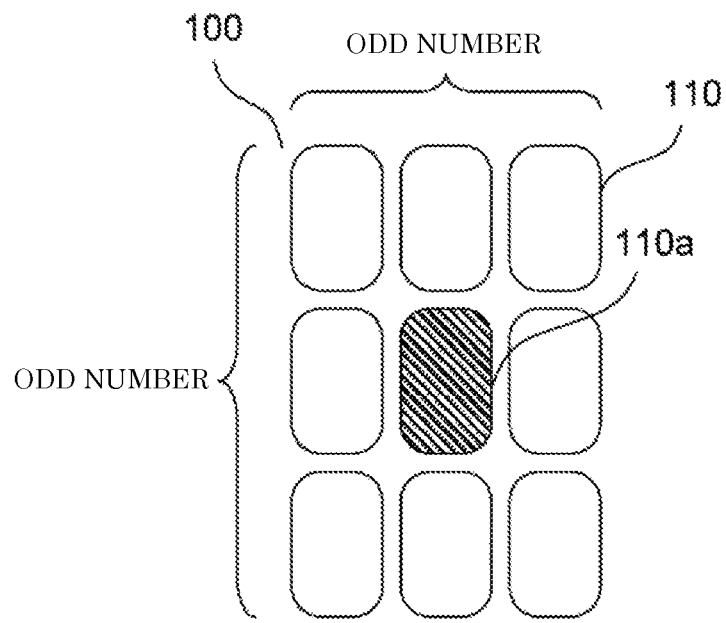
FIG. 9A is an explanatory diagram illustrating a variation.
Figure 9B:
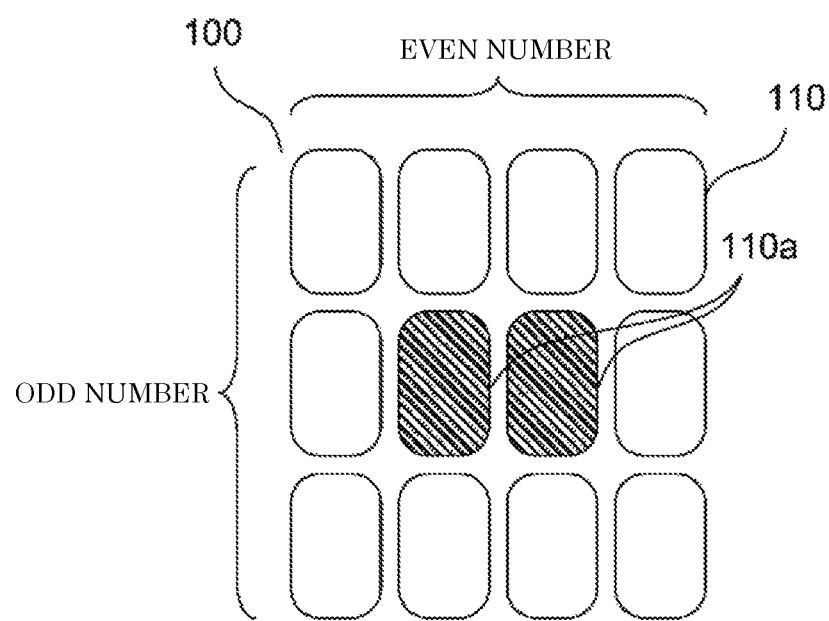
FIG. 9B is an explanatory diagram illustrating another variation.
Figure 9C:
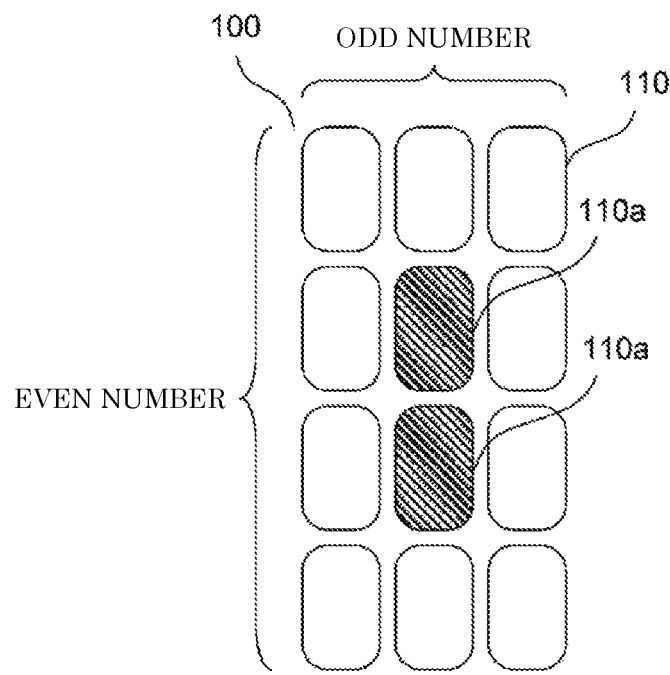
FIG. 9C is an explanatory diagram illustrating further another variation.
Figure 9D:
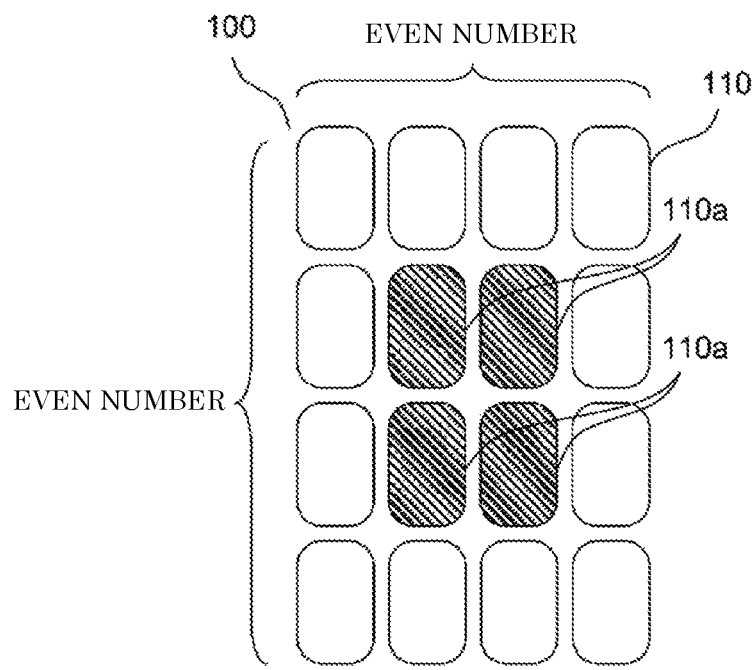
FIG. 9D is an explanatory diagram illustrating yet another variation.

For example, in the foregoing exemplary embodiment, capacitor element group 100 includes 10 capacitor elements 110. Further, 10 capacitor elements 110 are arrayed along the shorter side whereas one capacitor element 110 is arrayed along the longer side. However, an arrangement of capacitor element group 100 is not limited to this. Alternatively, capacitor element group 100 may include a plurality of capacitor elements 110, three or more of which are arrayed along one of the shorter and longer sides and one or more of which are arrayed along the other side. In this case, if an odd number of capacitor elements 110 in capacitor element group 100 are arrayed along the shorter side and an odd number of capacitor elements 110 are also arrayed along the longer side, as illustrated in FIG. 9A, a capacitor element at the center corresponds to central capacitor element 110a. If an even number of capacitor elements 110 in capacitor element group 100 are arrayed along the shorter side and an odd number of capacitor elements 110 are arrayed along the longer side, as illustrated in FIG. 9B, two capacitor elements disposed at the center side by side along the shorter side correspond to central capacitor elements 110a. If an odd number of capacitor elements 110 in capacitor element group 100 are arrayed along the shorter side and an even number of capacitor elements 110 are arrayed along the longer side, as illustrated in FIG. 9C, two capacitor elements disposed at the center and side by side along the longer side correspond to central capacitor elements 110a. If an even number of capacitor elements 110 in capacitor element group 100 are arrayed along the shorter side and an even number of capacitor elements 110 are also arrayed along the longer side, as illustrated in FIG. 9D, four capacitor elements disposed at the center and side by side along the longer side and the shorter side correspond to central capacitor elements 110a.

Figure 10:
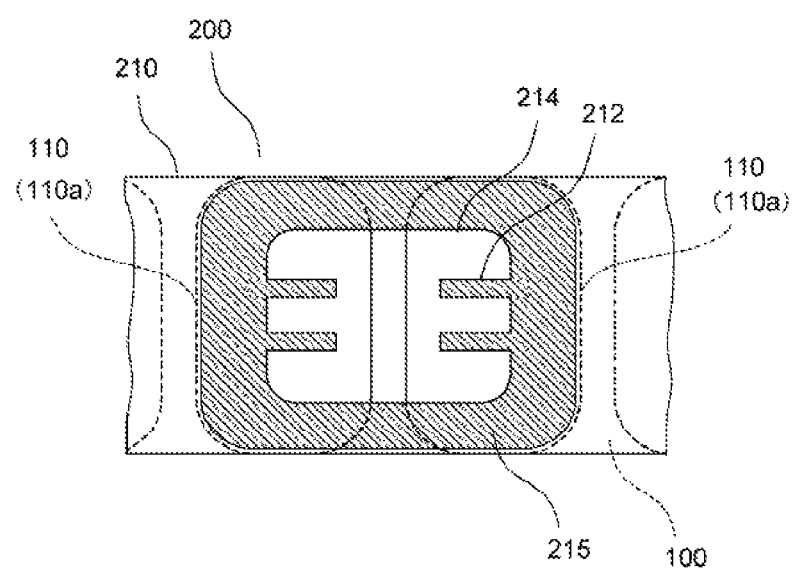
FIG. 10 is an explanatory diagram illustrating the variations.

In the foregoing exemplary embodiment, first electrode terminal part 210 of upper bus bar 200 includes first electrode terminals 211 each of which extends from its base end so as to bridge two corresponding capacitor elements 110. However, a configuration of first electrode terminal part 210 is not limited to this. Alternatively, as illustrated in FIG. 10, first electrode terminal part 210 may cover most of entire capacitor element group 100 and may include apertures 214 and connection pins 212. Each of apertures 214 is formed over portions of two corresponding capacitor elements 110. And connection pins 212 are formed at a periphery of each aperture 214. In this case, a regional portion, designated by hatched lines in FIG. 10, of upper bus bar 200 which is in contact with central capacitor elements 110a adjoining to aperture 214 corresponds to contact region 215.

In the foregoing exemplary embodiment, holder 600 that is provided with bus-bar-side fixing part 620 and case-side fixing part 630 is fixed to both case 20 and upper bus bar 200. However, if the strength of holder 600 is sufficient, holder 600 does not necessarily have to include bus-bar-side fixing part 620. In that case, holder 600 does not have to be fixed to upper bus bar 200. Regardless of whether holder 600 is fixed to upper bus bar 200, case-side fixing part 630 may be further fixed to case 20 with screws, for example, if it is necessary to reinforce holder 600.

In the foregoing exemplary embodiment, holder 600 is fixed to both upper bus bar 200 and case 20 by a fitting mechanism of bus-bar-side fixing part 620 and case-side fixing part 630. However, holder 600 is fixed to both upper bus bar 200 and case 20 by another fitting mechanism of bus-bar-side fixing part 620 and case-side fixing part 630.

In the foregoing exemplary embodiment, upper aperture 613 and lower aperture 616 are formed in housing 610 of holder 600. However, both of upper aperture 613 and lower aperture 616 necessarily have to be formed if filling resin 40 can easily be poured into housing 610.

In the foregoing exemplary embodiment, thermosensing part 511 of temperature detection element 510 is disposed so as to be in contact with central electrode terminal 211a of upper bus bar 200. However, if a sensed temperature is substantially as accurate as a sensed temperature obtained when thermosensing part 511 is in contact with central electrode terminal 211a, thermosensing part 511 may be disposed above central electrode terminal 211a with a small gap therebetween.

Each of capacitor elements 110 is formed by overlaying two metalized films in which aluminum is deposited on dielectric films and by winding or layering the overlaid metalized films. Alternatively, each of capacitor elements 110 may be formed by making a metalized film in which aluminum is deposited on both sides of a dielectric film, by overlaying the metalized film on an insulating film, and by winding or laminating the overlaid films.

In the foregoing exemplary embodiment, film capacitor 1 is exemplified as an example of the capacitor of the present disclosure. However, it should be noted that the present disclosure is applicable to capacitors other than film capacitor 1.

In addition, various modifications can be made to the exemplary embodiment of the present disclosure as appropriate within the scope of the technical idea disclosed in the claims.

It should be noted that, in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is effective for capacitors used for various electric components of electronic devices, electrical devices, industrial devices, and vehicles, for example.

What is claimed is:

1. A capacitor comprising:
   a capacitor element group that includes a plurality of capacitor elements in which three or more of capacitor elements are arrayed in a first direction and one or more of capacitor elements are arrayed in a second direction, the second direction being perpendicular to the first direction;
   a first bus bar connected to first electrodes of the plurality of capacitor elements;
   a second bus bar connected to second electrodes of the plurality of capacitor elements;
   a case that accommodates a capacitor unit in which the capacitor element group is connected to both the first bus bar and the second bus bar;
   a filling resin that is filled and cured in the case;
   a temperature detection element and a holder that retains the temperature detection element, wherein:
   the first bus bar includes a contact region that is in contact with at least one capacitor element in the plurality of capacitor elements at a side close to an aperture of the case, the at least one capacitor element being positioned at a center of the capacitor element group in the first direction and in the second direction,
   the temperature detection element is disposed on the contact region, and
   the holder includes a housing and a case-side fixing part, the housing accommodating the temperature detection element, the case-side fixing part being fixed to the case.

2. The capacitor according to claim 1, wherein:
   the case has an engagement part into which the case-side fixing part is fitted so as to block the holder from moving along a periphery of the aperture of the case, and
   the engagement part communicates with an interior of the case, and is filled with the filling resin via the interior of the case.

3. The capacitor according to claim 1, wherein the holder further includes a bus-bar-side fixing part that is fixed to the first bus bar.

4. The capacitor according to claim 1, wherein the housing accommodates the temperature detection element and a harness extending from the temperature detection element in a state where the temperature detection element and the harness are disposed along the periphery of the aperture of the case.

5. The capacitor according to claim 4, wherein the housing has a curved part that is curved along the periphery of the aperture of the case.

6. The capacitor according to claim 4, wherein the housing includes a first pressing part, a second pressing part, and a third pressing part, the first pressing part and the second pressing part pressing a set of the temperature detection element and the harness in one direction, the third pressing part pressing the set, in another direction opposite to the one direction, at a location between the first pressing part and the second pressing part.

7. The capacitor according to claim 1, wherein the housing includes a flow opening through which the filling resin flows.

8. The capacitor according to claim 1, wherein a thermosensing part of the temperature detection element is in contact with the contact region to detect a temperature of the contact region, the thermosensing part being disposed at an end of the temperature detection element.

* * * * *